Nov. 5, 1963

C. HOROWITZ 3,109,442

TRACTOR PROTECTION VALVE

Filed Oct. 11, 1961

INVENTOR.
Charles Horowitz,
BY Parker & Carter
Attorneys.

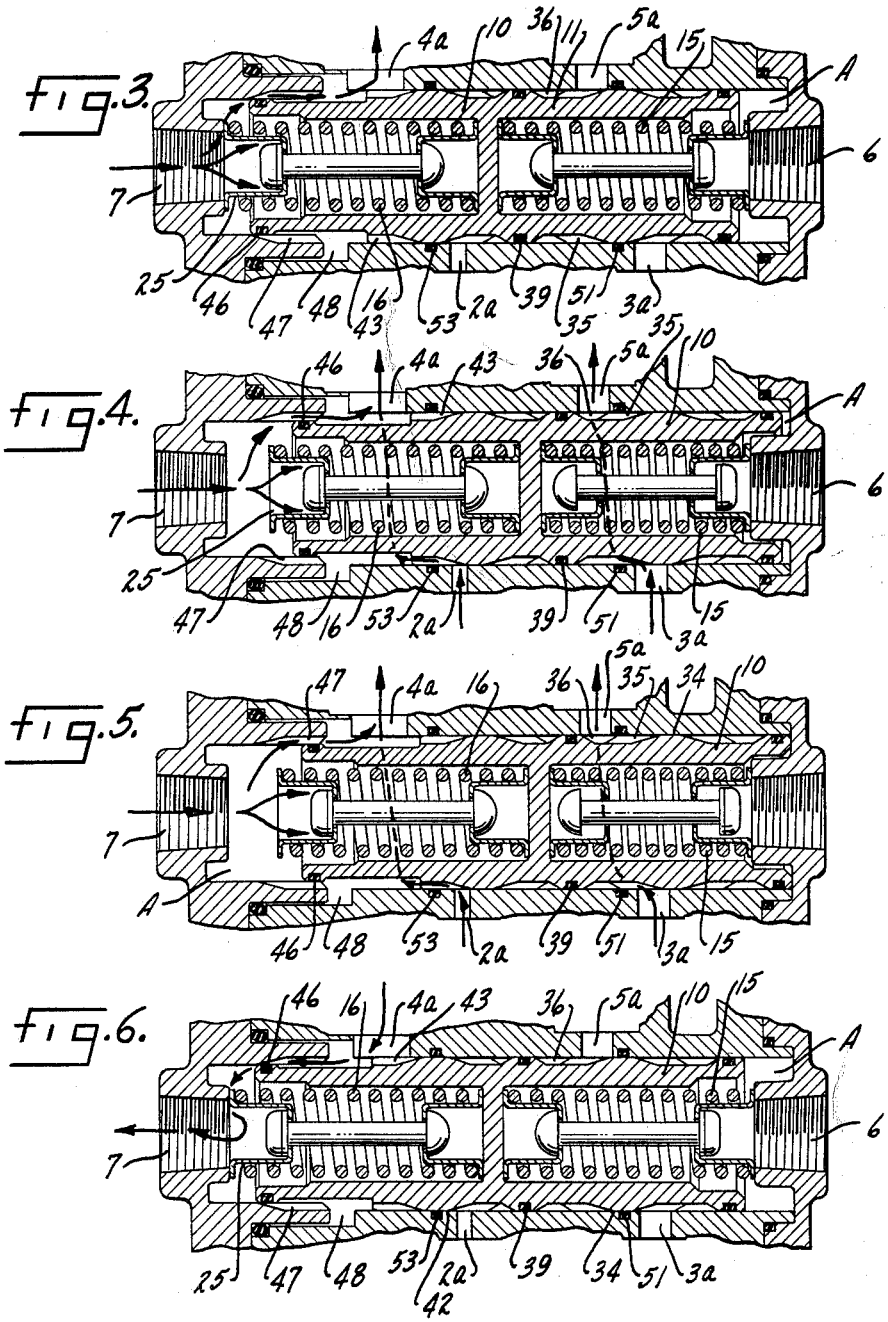

Nov. 5, 1963  C. HOROWITZ  3,109,442
TRACTOR PROTECTION VALVE
Filed Oct. 11, 1961  3 Sheets-Sheet 3
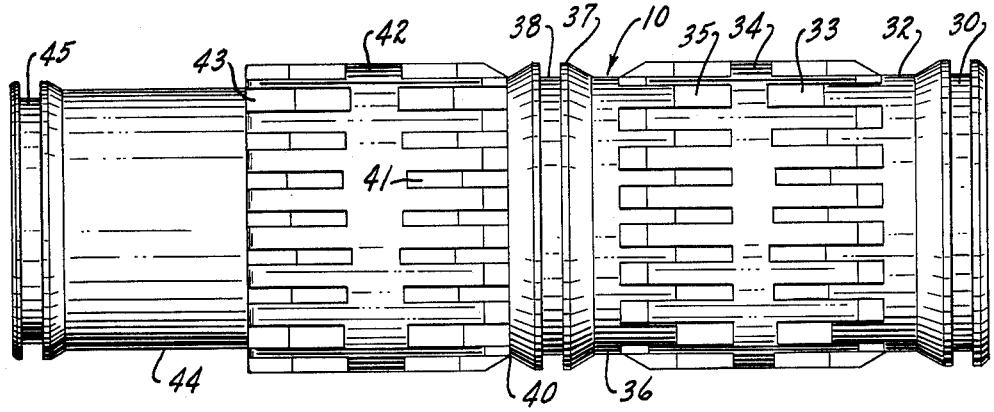
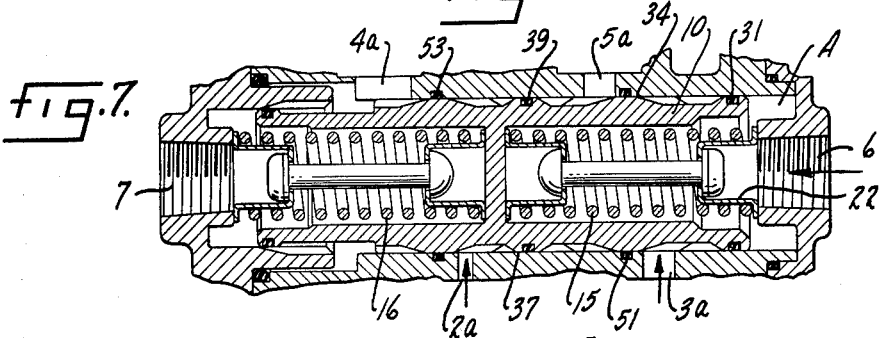
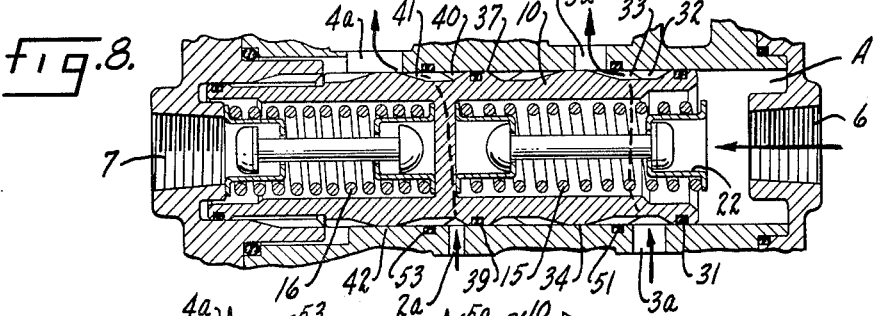
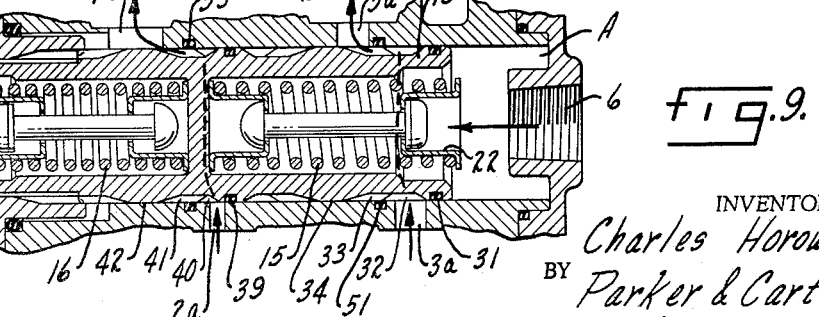
INVENTOR.
Charles Horowitz,
BY Parker & Carter
Attorneys.

United States Patent Office 3,109,442
Patented Nov. 5, 1963

3,109,442
TRACTOR PROTECTION VALVE
Charles Horowitz, Chicago, Ill., assignor to Berg Airlectro Products Co., Chicago, Ill., a corporation of Illinois
Filed Oct. 11, 1961, Ser. No. 144,403
12 Claims. (Cl. 137—111)

This invention relates to valves and has particular relation to a protection valve for the fluid operated brake system of vehicles such as tractor-trailer combinations and the like.

One purpose of the invention is to provide a tractor system protection valve of maximum simplicity and minimum of parts.

Another purpose is to provide a tractor protection valve of maximum economy in manufacture and reliability in use.

Another purpose is to provide a valve which may be employed in a tractor-trailer air brake system to protect the brake system of the tractor against loss of air pressure due to leaks or broken lines in the trailer air system.

Another purpose is to provide a valve effective automatically to protect the air brake system of a tractor against loss of air pressure due to leaks or broken lines in a trailer air system.

Another purpose is to provide a valve effective manually to protect the air brake system of a tractor against loss of air pressure due to leaks or broken lines in a trailer air system.

Another purpose is to provide a tractor air brake system protection valve which cannot be inadvertently overridden.

Another purpose is to provide a tractor protection valve which automatically seals a tractor's air brake system if the air brake system of a trailer sustains a leak or breakage.

Another purpose is to provide a valve effective to permit a vehicle operator to transfer the trailer air system from a normal into an emergency operation.

Another purpose is to provide a tractor protection valve effective to permit the vehicle operator to charge the air brake system of a trailer from a position within the tractor.

Another purpose is to provide a tractor protection valve usable with a variety of air brake system control valves.

Another purpose is to provide a tractor protection valve having a single moving part.

Another purpose is to provide a tractor protection valve having a single moving part simultaneously effective within both the service and emergency air brake system of a tractor and both the service and emergency air brake system of a trailer.

Another purpose is to provide a tractor protection valve effective to isolate and protect both the service air brake system and the emergency air brake system of a tractor during the charging of the trailer emergency air brake system.

Another purpose is to provide a tractor protection valve effective automatically to move into a position isolating the tractor emergency and service air brake systems in response to movement of a system control valve into an emergency position.

Another purpose is to provide a tractor protection valve having a single moving part and effective to accomplish the desired direction of fluid pressure therethrough when said moving part is moved in either of two opposite directions.

Other purposes will appear from time to time during the course of the specification and claims.

I illustrate my invention more or less diagrammatically in the accompanying drawings, wherein:

FIGURE 3 is a schematic view illustrating the valve in one state of its operation;

FIGURE 4 is a schematic view illustrating the valve in another stage of its operation;

FIGURE 5 is a schematic view illustrating the valve in a still further stage of its operation;

FIGURE 6 is a schematic view illustrating the valve in still another stage of its operation;

FIGURE 7 is a schematic view illustrating the valve of the invention in association with another type of control valve;

FIGURE 8 is a schematic view illustrating the valve of FIGURE 7 in one stage of its operation;

FIGURE 9 is a schematic view illustrating the valve of FIGURE 8 in another stage of its operation; and FIGURE 10 is a top plan view of the shuttle valve member of FIGURE 2.

Like parts are indicated by like numerals throughout the specification and drawings.

Figure 1:
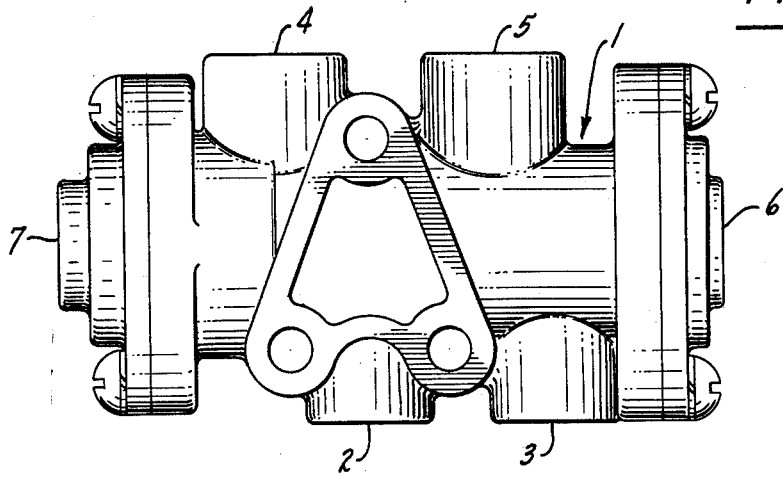
FIGURE 1 is a side elevation.

Referring now to the drawings, and particularly ot FIGURE 1, the numeral 1 generally designates a valve housing. The housing 1 has a pair of downwardly disposed, as the parts are shown in the drawings, spaced ports 2, 3 and a pair of oppositely or upwardly disposed spaced ports 4, 5. At its opposite ends, the housing 1 has inlets 6, 7.

Figure 2:
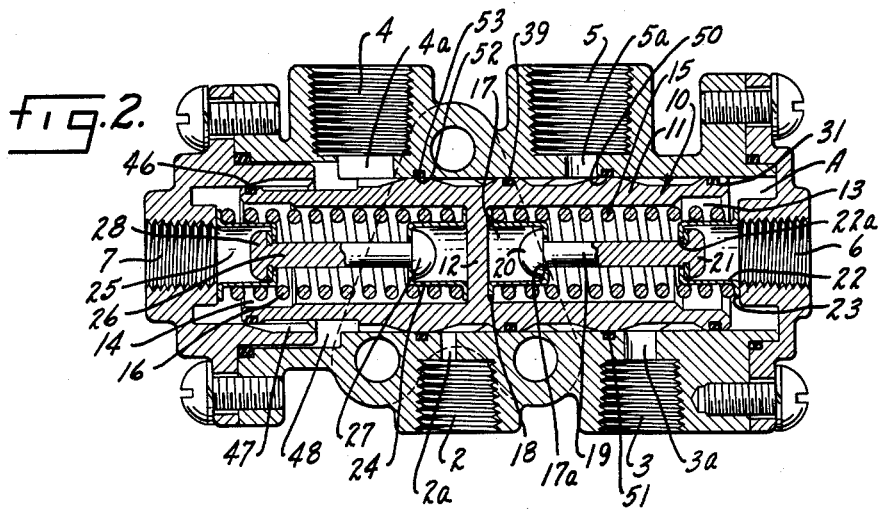
FIGURE 2 is a side view in cross section and on an enlarged scale.

Referring now to FIGURE 2, it will be observed that the ports 2–5 communicate with a valve chamber A at spaced points longitudinally therealong and the inlets 6, 7 communicate with said chamber at the opposite ends thereof. It will be observed that the ports 4, 5 are alternately offset, longitudinally of chamber A, from the ports 2, 3. While the inlets 6, 7 are formed in end caps secured by fasteners to the housing 1, and while these end caps have portions extending into chamber A and may have, as is apparent in relation to the end cap defining inlet 7, portions serving partially to define the chamber A, it will be realized that parts of the caps could be formed integrally with the housing and vice versa, and the chamber A will therefore be described as it exists without regard to whether portions defining chamber A are integral with either of the end caps or with the main body of housing 1.

The chamber A is cylindrical in cross section and elongated, having a continuous diameter extending from the end communicating with inlet 6 to a point adjacent its communication with port 4, the continuing portion of chamber A, with which inlet 7 communicates, being reduced in diameter.

Reciprocal in chamber A is an elongated valve shuttle member 10 having substantially hollow circular or annular wall 11. A central web 12 bisects the wall 11 and forms with the inner circumferential surface of the wall 11 on opposite sides of the web, a pair of oppositely directed outwardly open wells 13, 14. A spring 15 is operative in and substantially fills well 13. A spring 16, substantially identical with spring 15, is operative within and substantially fills well 14. A generally cup shaped spring retainer element 17 has an annular flange 18 having a surface seated on the surface of web 12 forming a bottom wall for well 13. The spring 15 has one of its ends bearing against the opposite surface of flange 18. A tie rod 19 extends through a portion of spring 15 and through an aperture 17a in retainer 17. An enlargement or head 20 on rod 19 is received within the area of retainer 17 and abuts the inner surface thereof about the aperture 17a. At its opposite end the tie rod 19 has a head or enlargement 21 received within a similar cup shaped member 22, the rod 19 extending through an aperture 22a in the bottom or base wall of the cup shaped member 22. An outwardly directed annular flange 23 on member 22 has one of its surfaces seated on a portion of housing 1 surrounding inlet 6 and its opposite surface engaged by an end of spring 15.

Cup shaped retainer members 24, 25 are similarly associated with the spring 16 and with a tie rod 26 having enlargements 27, 28 received within members 24, 25, respectively. As described in relation to member 22, the annular flange of member 25 seats on housing 1 about the inlet 7.

The outer circumferential surface of valve shuttle 10 has a seal-receiving groove 30 formed adjacent that end of shuttle 10 which is reciprocatingly adjacent the inlet 6. A seal, such as the O-ring 31, is carried in groove 30 and sealingly engages the inner wall of chamber A. Spacedly inward from groove 30, the circumferential wall of shuttle 10 has an annular recess 32 formed therein to create an annular passage in association with the opposed portion of the wall of chamber A. A plurality of longitudinally disposed, circumferentially spaced grooves, indicated by the numeral 33, are formed beyond the groove 30 from recess 32 and are of substantially the same depth as recess 32 with which grooves 33 communicate. An unbroken circumferential wall portion 34 of shuttle 10 adjoins the grooves 33 and is of a diameter substantially equal to the inner diameter of chamber A. A plurality of longitudinal grooves 35 are formed in the circumferential wall of shuttle 10 adjacent the circumferential portion 34 and communicate with a second recess 36 which forms with the opposed portion of the wall of chamber A an annular passage. Adjacent the recess 36 a second circumferential wall portion 37 of a diameter substantially equal to that of portion 34 is formed. An annular groove 38 is formed in wall portion 37 and carries therewithin a seal such as the O-ring 39. An annular recess 40 adjoins the wall portion 37 and a plurality of longitudinal grooves 41 communicate with the recess 40 and the annular passage formed thereby with opposed portions of the wall of chamber A, the grooves 41 being of substantially the same depth as recess 40. A third circumferential wall portion 42 of shuttle 10 adjoins the grooves 41 and is of a diameter substantially equal to that of portion 34. A plurality of longitudinal grooves grooves 43 adjoin the circumferential portion 42. The wall 11 of shuttle member 10 is recessed as at 44 to a depth equal to or greater than the depth of grooves 43 whereby the end of grooves 43 beyond portion 42 are open to an annular passage 48 formed by the recessing or inward offsetting of wall 11.

Adjacent the end of shuttle 10 opposite that carrying grooves 30, an annular groove 45 is formed in the outer surface of wall 11 and carries therewithin a seal such as the O-ring 46. The wall surface of chamber A, which, in the form illustrated in FIGURE 2, is comprised of an inwardly extending annular portion of the end cap defining inlet 7, has a plurality of longitudinally extending grooves 47 formed therein. The grooves 47 communicate with the annular passage 48 with which the grooves 43 communicate and the portions of the wall between the grooves 47 serve to support the seal 46 when the shuttle member moves through a part of its excursion.

As best seen in FIGURE 10, the longitudinally disposed grooves formed in shuttle 10 may have alternately varying lengths and the sidewalls of the grooves may or may not be parallel, those grooves aligned generally with ports 2–5 having parallel sidewalls, while the intervening sets of grooves do not.

The port 3 communicates through passage 3a with chamber A adjacent inlet 6. The port 5 communicates with chamber A through a passage 5a which is positioned beyond inlet 3a from inlet 6. Between passage 3a and passage 5a, the inner circumferential wall defining chamber A has an annular groove 50 formed therein and a seal, such as the O-ring 51, is seated within groove 50 for sealing engagement with the circumferential wall portion 34 of shuttle 10 and is retained in groove 50 by the outer circumferential surface of shuttle 10 between the grooves 33 and the grooves 35 when the shuttle member moves in opposite directions from that shown in FIGURE 2. Beyond the circumferential wall portion 37 and seal 39 carried in groove 38, the port 2 communicates with chamber A through passages 2a, the wall portion 37 and seal 39 being positioned between passage 5a and passage 2a at all positions of shuttle 10. The port 4 communicates with chamber A through the passage 4a which is longitudinally spaced from pasage 2a and beyond seal 39 therefrom. Between passage 2a and passage 4a, the inner circumferential wall defining chamber A has a groove 52 formed therein and a seal, such as the O-ring 53, is carried within groove 52 for sealing engagement with circumferential wall portion 42 of shuttle member 10 and is retained in groove 52 by the portions of the outer circumferential surface of shuttle 10 between the grooves 41 and 43 when the shuttle member 10 moves in opposite directions from the position illustrated in FIGURE 2. Similarly, the seal 46 engages the inner wall of chamber A when the shuttle member 10 is moved to the left from the position illustrated in FIGURE 2 and is retained in groove 45 by the portions of the wall between the grooves 47 when the shuttle is in the position illustrated in FIGURE 2 and when the shuttle moves to the right from said position, as the parts are shown in the drawings.

The cup-shaped retainer 25 has merely a metal to metal contact with the area about inlet 7 whereby air entering inlet 7 may pass between member 25 and the cap bearing inlet 7. Alternatively, of course, member 25 could have its circumferential wall, for example, slotted or apertured to assure such passage of air therethrough.

The use and operation of the invention are as follows:

In FIGURES 3–9, schematic illustrations of the operation of the invention are provided. Referring first to FIGURE 3, there is illustrated the initial step in the operation of the valve when the tractor protection valve of the invention is associated with a system control valve known in the art as a "vented type." Such valve would deliver fluid pressure to inlet 7, as shown by the arrows in FIGURE 6. At the moment of delivery of fluid pressure at inlet 7, the valve of the invention is in the "at rest" or "balanced" condition. The springs 15, 16, being substantially identical, hold the valve shuttle member 10 in the balanced or neutral position illustrated in FIGURE 3.

When the system control valve is placed, by the vehicle operator, in "charged" position, fluid pressure is delivered at inlet 7. So long as such fluid pressure is less than 35 pounds per square inch, the fluid entering inlet 7 passes through member 25 and about seal 46 entering the grooves 47 and from thence entering passage 4a which permanently communicates with the annular passage 48 with which the grooves 43 and 47 communicate, and fluid pressure is thereby delivered to port 4 and from port 4 into the trailer emergency air brake system line, charging the trailer tank through a relay emergency valve or similar device. Under these conditions, the pressure acting upon shuttle 10 is insufficient to move shuttle 10 against the force of spring 15. During this charging operation, therefore, the air from the tractor emergency system which is connected to port 2 and from the tractor service air brake system which is connected to port 3 is blocked off by the engagement of seals 53, 39 and 51 with the shuttle 10.

Referring now to FIGURE 4, there is illustrated the situation which obtains when the trailer emergency system has been charged. At this point, the pressure entering inlet 7 builds up and when between 35 and 40 p.s.i. is reached, the inlet pressure acting upon shuttle 10 is sufficient to start the shuttle 10 moving away from inlet 7, or to the right as the parts are shown in the drawings, against the force of spring 15. When shuttle 10 has thus been moved a distance sufficient to expose inlets 3a and 2a to the grooves 35, 43, air entering ports 2, 3, respectively, from the tractor emergency and service air brake systems is allowed to pass through said grooves and into recess 36 and the annular passage 48 with which grooves 43 communicate. It will be observed that passage 4a is continuously in communication with the annular passage 48 with which grooves 43 communicate and that the recess 36 is in communication with passage 5a when the shuttle 10 has moved to the position illustrated in FIGURE 4. Thus, air entering through port 2 is delivered to port 4, and air entering through port 3 is delivered to port 5. In FIGURE 4, the shuttle member 10 has not completed its full excursion in response to the pressure entering inlet 7. Some of the air entering inlet 7 continues to be available for passage about seal 46 and for delivery to port 4. Similarly, the charging of the trailer tank through port 4 and through any suitable emergency relay valve connected thereto, may be completed from air entering through port 2 from the tractor emergency system.

In FIGURE 5, the shuttle 10 is shown in the fully safe operating position. At this point, a safe operating pressure of over 60 p.s.i. has been attained. Shuttle 10 has been moved by such pressure to its normally fully charged position and is against a stop formed by an inner end wall of chamber A, and full air communication between the tractor emergency system and the trailer emergency system and between the tractor service system and the trailer service system has been attained.

In FIGURE 6, the shuttle 10 is illustrated in the emergency position. The system control valve of the system incorporating the valve of the invention may be placed in its emergency position either by manual operation of the vehicle operator or in automatic response to a diminution of emergency or tank pressure below a predetermined level. With the vented type of system control valve connected to inlet 7, the positioning of the control valve in emergency position produces a venting of the pressure supply line running from the control valve to inlet 7 of the tractor protection valve. Thus, with the protection valve supply line vented to atmosphere, the force of spring 15 is no longer overcome and spring 15 moves the shuttle 10 toward inlet 7, or to the left as the parts are shown in the drawings. Thus, the shuttle wall portion 34 is brought into sealing engagement with the seal 51 and the shuttle wall portion 42 is brought into sealing engagement with the seal 53, to close off the supply of tractor service and emergency air, respectively, and thus to protect the tractor air brake system from any loss of fluid pressure through the protection valve of the invention.

As illustrated by one of the arrows in FIGURE 6, while the tractor emergency and service air brake systems are closed off and protected, the trailer emergency line connected to port 4 continues to be vented to atmosphere through the grooves 47 and about seal 46, through retainer 25 and outwardly through inlet 7, it being understood that the diminution of pressure from the trailer emergency line will cause the trailer emergency relay valve to automatically apply full pressure to the trailer air brake chambers and thus to apply the brakes of the trailer.

In FIGURE 7, the schematic illustration envisages the connection of inlet 6 the valve of the invention to a system control valve known as the "non-vented type."

As illustrated in FIGURE 7, fluid pressure delivered at inlet 6 is of an amount less than 35 pounds per square inch. The seal 31 is continuously in engagement with the inner wall of chamber A and a pressure less than 35 p.s.i. delivered at inlet 6 produces no reaction of shuttle 10, the force of spring 16 being sufficient to retain the shuttle 10 in the position illustrated in FIGURE 7 against the action of such pressure. In this position, the tractor emergency and service air systems respectively connected to ports 2 and 3, are blocked off and cannot deliver fluid pressure through the valve of the invention.

In FIGURE 8, the pressure entering inlet 6 has risen to a value between 35 and 40 p.s.i. Such pressure is sufficient, due to the design of the springs involved, to start the shuttle 10 moving away from inlet 6 and against the force of spring 16 to open air communication between the tractor emergency and service lines and the trailer emergency and service lines, i.e., between ports 2 and 3 and 4 and 5, respectively. In this position, the trailer tank, connected to port 4, is charged from the tractor emergency line which is connected to port 2. The pressure entering through inlet 6 continues to be retained by seal 31 and does not leave the valve of the invention.

In FIGURE 9, a safe operating pressure of over 60 p.s.i. has been attained. A pressure of this magnitude entering inlet 6 is sufficient to move the shuttle in its full excursion away from inlet 6, or to the left as the parts are shown in the drawings, and to bring it against a stop formed by an end wall of chamber A. At this point, full air communication has been achieved between ports 2 and 3 and 4 and 5, respectively.

Attention is recalled to FIGURE 6. FIGURE 6 illustrates the emergency position of shuttle 10 when the valve of the invention is employed with either the vented or non-vented type system control valve. It will be understood that the inlet 6 may be allowed to remain open, or may be plugged, as desired, when the valve of the invention is employed with the vented type control valve, as illustrated in FIGURES 3-5, since the inlet 6 is inoperative for any purpose under such circumstances. When the valve of the invention is employed with the non-vented type, however, as illustrated in FIGURES 7-9, the inlet 7 is not plugged, but is allowed to remain open to atmosphere. In the emergency position illustrated in FIGURE 6, when the valve is associated with the non-vented type control valve, the pressure available from the control valve and delivered to inlet 6 has dropped to 38 pounds per square inch or less. This pressure is not sufficient to hold the shuttle 10 against the force of spring 16. Spring 16 thus moves the shuttle 10 toward inlet 6, or to the right as the parts are shown in the drawings, from the position illustrated in FIGURE 9. Thus, the shuttle 10 is moved into the position illustrated in FIGURE 6, and the circumferential wall portions 34, 42 are brought into sealing engagement with the seals 51, 53, respectively, to shut off the tractor emergency and service air brake systems connected to ports 2 and 3, respectively, and thus to protect the systems against the loss of fluid pressure. In this position, the trailer emergency line secured to port 4 is in communication, through grooves 47 and about seal 46, with the inlet 7 which is vented to atmosphere. Thus the trailer emergency line is vented to atmosphere through inlet 7 and this loss of pressure in the trailer emergency line causes a trailer emergency relay valve automatically to apply full pressure to the trailer brake chambers and thus to apply the brakes of the trailer.

Whereas I have shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

I claim:
1. In a valve, a housing, an elongated chamber in said housing, a first fluid pressure inlet in said housing and communicating with one end of said chamber, a second fluid pressure inlet in said housing and communicating with the opposite end of said chamber, a first port in said housing communicating with said chamber adjacent said first inlet, a second port in said housing communicating with said chamber beyond said first port from said first inlet, a third port in said housing communicating with said chamber beyond said second port from said first port, a fourth port in said housing communicating with said chamber beyond said third port from said second port and between said third port and said second inlet, a shuttle member mounted for reciprocation in said chamber, a first spring in said chamber and having its opposite ends operative against an end wall of said chamber and said shuttle to urge said shuttle away from said first inlet, a second spring of substantially identical force with said first spring, said second spring being mounted in said chamber and operative against a wall of said chamber and said shuttle to urge said shuttle away from said second inlet, and seal elements operative between said shuttle member and said housing to seal said first inlet from communication with any of said ports and with said second inlet, a second seal positioned to seal said first port from communication with said second port when said shuttle is in one position, a third seal positioned to seal said second port from said third port at all positions of said shuttle, a fourth seal positioned to seal said third port from said fourth port at one position of said shuttle, and a fifth seal positioned to seal said second inlet from communication with any of said ports and with said first inlet when said shuttle is traversing one end portion of its excursion in said chamber, said shuttle and housing having cooperating configurations effective to produce substantially identical communication between said ports when said shuttle is moved in either direction within said housing.

2. In a valve, a housing, an elongated chamber in said housing, a first fluid pressure inlet in said housing and communicating with one end of said chamber, a second fluid pressure inlet in said housing and communicating with the opposite end of said chamber, a first port in said housing communicating with said chamber adjacent said first inlet, a second port in said housing communicating with said chamber beyond said first port from said first inlet, a third port in said housing communicating with said chamber beyond said second port from said first port, a fourth port in said housing communicating with said chamber beyond said third port from said second port and between said third port and said second inlet, a shuttle member mounted for reciprocation in said chamber, a first spring in said chamber and having its opposite ends operative against an end wall of said chamber and said shuttle to urge said shuttle away from said first inlet, a second spring of substantially identical force with said first spring, said second spring being mounted in said chamber and operative against a wall of said chamber and said shuttle to urge said shuttle away from said second inlet, a seal between said first and second ports, a second seal between said third and fourth ports, said shuttle having an outer circumferential surface, said outer circumferential surface having a plurality of longitudinally spaced annular recesses forming annular passages with opposed portions of the wall of said chamber, there being one of said annular recesses on each side of each of said seals when said shuttle member is in sealing engagement with said seals whereby communication between said first and second ports and between said third and fourth ports is created upon movement of said shuttle in either direction.

3. In a tractor protection valve, a housing, an elongated chamber in said housing, a plurality of fluid pressure inlets communicating with said chamber, an elongated shuttle reciprocally mounted in said chamber, a pair of springs of substantially identical force mounted in said chamber and operative against said shuttle to urge the same in opposite directions whereby action of said springs alone upon said shuttle is effective to move said shuttle into a balanced position, a plurality of ports longitudinally spaced in said housing and communicating with said chamber at longitudinally spaced points therealong, a plurality of seal elements longitudinally spaced in relation to said chamber and said shuttle and effective to seal each of said ports against communication with any other of said ports when said shuttle is in said balanced position, said shuttle having a plurality of longitudinally spaced annular recesses, said recesses being positioned on opposite sides of each of said seals whereby movement of said shuttle in either direction from said balanced position is effective to place some of said ports in communication one with the other through said recesses.

4. The structure of claim 3 characterized by and including a seal carried by one end of said shuttle and a passage in said housing effective to permit communication between one of said fluid pressure inlets and one of said ports when said shuttle is in said balanced position.

5. The structure of claim 3 characterized by and including a seal carried adjacent one end of said shuttle and effective to seal one of said fluid pressure inlets against communication with any of said ports at all positions of said shuttle.

6. The structure of claim 3 wherein some of said seal elements are carried in grooves formed in the inner wall defining said chamber, and characterized by a plurality of longitudinally disposed, circumferentially spaced grooves in the outer wall of said shuttle adjacent said annular recesses and communicating therewith to provide ridges retaining said seals in said grooves when said shuttle member moves in opposite directions from said balanced position while providing initial communication between some of said ports through said grooves and recesses.

7. In a valve, a chamber, a plurality of ports communicating with said chamber at longitudinally spaced points therealong, a shuttle member reciprocal in said chamber, a pair of springs of substantially identical power operative against said shuttle to urge the same in opposite directions and to maintain said shuttle in a balanced position in the absence of fluid pressure in said chamber above a predetermined amount, said shuttle having a plurality of longitudinally spaced annular recesses of sufficient width to bridge the space between some of said ports and to create communication therewith when said shuttle has been moved in either direction out of said balanced position to bring said recesses into said bridging position, and a seal assembly operative between the wall of said chamber and said shuttle to seal said ports from communication therebetween when said shuttle is in said balanced position.

8. In a valve, a chamber, a plurality of ports communicating with said chamber at longitudinally spaced points therealong, a shuttle member reciprocal in said chamber, a pair of substantially identically powered springs operative against said shuttle to urge the same in opposite directions and to maintain said shuttle in a balanced position in the absence of fluid pressure in said chamber above a predetermined amount, said shuttle having a plurality of longitudinally spaced annular recesses of sufficient width to bridge the space between some of said ports and to create communication therewith when said shuttle has been moved to bring said recesses into said bridging position, and a seal assembly operative between the wall of said chamber and said shuttle to seal said ports from communication therebetween when said shuttle is in said balanced position, a first fluid pressure inlet at one end of said chamber, a second fluid pressure inlet at the opposite end of said chamber, fluid pressure entering said first inlet above a predetermined amount being effective to move said shuttle in one direction, fluid pressure entering said second inlet above said predetermined amount being effective to move said shuttle in the opposite direction, the recesses in said shuttle being effective to create identical communication between the identifical ports when said shuttle is moved in either of said directions.

9. In a valve, a chamber, a plurality of ports communicating with said chamber at longitudinally spaced points therealong, a shuttle member reciprocal in said chamber, a pair of substantially identically powered springs operative against said shuttle to urge the same in opposite directions and to maintain said shuttle in a balanced position in the absence of fluid pressure in said chamber above a predetermined amount, said shuttle having a plurality of longitudinally spaced annular recesses of sufficient width to bridge the space between some of said ports and to create communication therewith when said shuttle has been moved to bring said recesses into said bridging position, and a seal assembly operative between the wall of said chamber and said shuutle to seal said ports from communication therebetween when said shuttle is in said balanced position, said ports comprising a first inlet port and a first outlet port longitudinally spaced therefrom, a second inlet port longitudinally spaced from said first outlet port and a second outlet port longitudinally spaced from said second inlet port, said recesses being effective to produce communication between said first inlet and said first outlet and between said second inlet and said second outlet when said shuttle is moved in either direction from said balanced position, and a further seal assembly between said shuttle and said chamber, said second seal assembly being positioned to seal said first outlet port from said second inlet port at all positions of said shuttle member.

10. In a valve, a housing, a valve chamber in said housing, a plurality of ports in said housing and communicating with said chamber, a valve shuttle reciprocable in said chamber, a pair of springs positioned in said chamber to urge said shuttle in opposite directions and into a balanced position, seal elements positioned in said chamber to seal said ports against intercommunication when said shuttle is in said balanced position and fluid pressure inlets in said housing and communicating with said chamber to deliver fluid pressure to opposite ends of said shuttle, said shuttle having conformations effective to produce identical intercommunication between said ports when said shuttle is moved in either direction from said balanced position and a passage communicating with one of said inlets and with one of said ports when said shuttle is in said balanced position.

11. In a tractor protection valve a housing, an elongated chamber in said housing, a plurality of longitudinally spaced ports communicating with said chamber, fluid pressure inlets communicating with the opposite ends of said chamber, an elongated shuttle reciprocally mounted in said chamber, a pair of substantially identical springs mounted in said chamber and operative against said shuttle to urge the same in opposite directions, a plurality of seal elements operative between said shuttle and said housing to seal said ports against communication therebetween when said shuttle is acted upon solely by said springs, said shuttle and housing having cooperating configurations effective to produce substantially identical communication between said ports when said shuttle is moved in either direction, an additional seal between said shuttle and said housing and a passage between said shuttle and housing about said additional seal effective to permit communication between one of said fluid pressure inlets and one of said ports when said shuttle is in the position produced by the action thereupon of said springs alone.

12. In a valve a housing, a chamber in said housing, at least one inlet port formed in said housing and communicating with said chamber, at least one outlet port formed in said housing and communicating with said chamber, a shuttle reciprocal in said chamber, operating pressure inlets positioned in said housing to deliver fluid pressure against said shuttle and to urge the same alternately in opposite directions, said shuttle and housing having cooperating configurations effective to produce substantially identical communication between said inlet and outlet ports when said shuttle is moved in either direction within said chamber, a passage configuration between said housing and shuttle and effective to produce communication between one of said operating pressure inlets and said outlet port when said inlet port is sealed against communication with said outlet port.

References Cited in the file of this patent

UNITED STATES PATENTS

| | | |
|---|---|---|
| 169,575 | Perrine | Nov. 2, 1875 |
| 2,090,843 | King | Aug. 24, 1937 |
| 2,200,578 | Mahon | May 14, 1940 |
| 2,365,095 | Miller | Dec. 12, 1944 |
| 2,485,504 | Morgan | Oct. 18, 1949 |
| 2,655,939 | Tauscher | Oct. 20, 1953 |
| 2,747,611 | Hewitt | May 29, 1956 |
| 3,026,892 | Tsien | Mar. 27, 1962 |

FOREIGN PATENTS

| | | |
|---|---|---|
| 42,666 | Denmark | July 28, 1930 |